June 30, 1959     L. N. AFTON     2,892,274
HAND SLIDE VIEWER
Filed May 29, 1953

Inventor
Leonard W. Afton
By Kurt W. Wonnell
Atty.

United States Patent Office 2,892,274
Patented June 30, 1959

2,892,274
HAND SLIDE VIEWER
Leonard N. Afton, Chicago, Ill.
Application May 29, 1953, Serial No. 358,481
6 Claims. (Cl. 40—63)

This invention relates to a portable viewer for slides, transparencies, films, and the like, and is more particularly described as a hand viewer in which the insertion of the slide automatically turns on the light which is extinguished by the return movement of the slide holder. The slide viewers now commonly used are objectionably large, heavy and cumbersome. It is not easy to support the viewer and at the same time to insert a slide, and it is usually necessary to press a button or operate a switch to control the lamp by which the slide is eliminated.

In the present invention, these objections are overcome by producing a small and compact parcel which contains two dry batteries and supports the slide holder at an angle at one end of the viewer so that it is easily gripped by one hand and held in an upright position so that a slide may be inserted by the other hand at an angle to the end of the viewer where it is easily within the vision of a person holding and manipulating the viewer.

An important object of the invention is to provide a light compact container for receiving batteries for a lamp and for supporting a slide holder at such an angle that a slide may be observed from one side of the upper end of the viewer.

A further object of the invention is to mount the slide holder at an angle in the viewer and to locate a lamp at a critical angle below the slide holder so that an entire slide will be readily illuminated by a single small lamp.

A further object in the invention is to provide a viewer having a slide holder engaged by a slide inserted at one side of the viewer and movable to turn a switch for lighting a lamp by the insertion of the slide and for extinguishing the lamp when the slide is withdrawn.

Other objects of the invention will appear in the specification and will be apparent from the accompanying drawings in which, Fig. 1 is a sectional elevation of a hand slide viewer in accordance with this invention.

Figure 1:
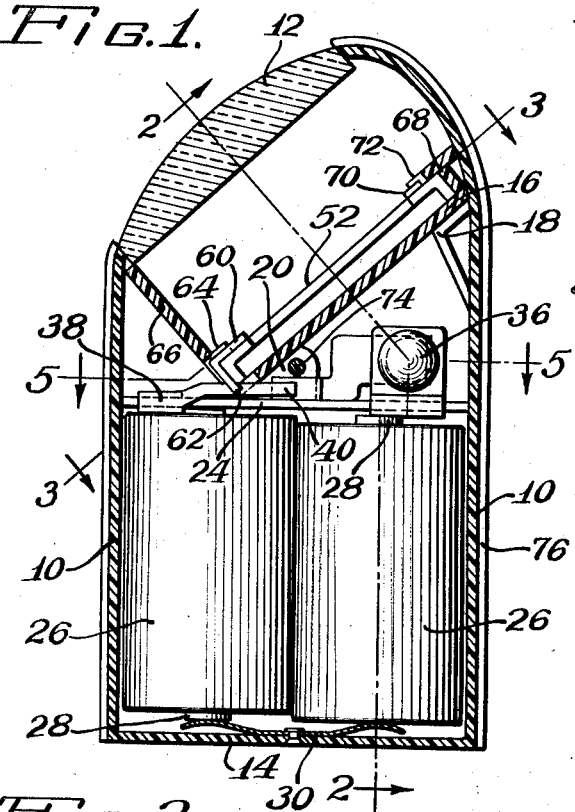

One of the desirable features of a hand viewer of this kind is that it be relatively small, light and easy to hold in one hand while applying a slide thereto with the other hand. The insertion of the slide in a slot at one side of the viewer engages and moves a slide holder to project it from the other side of the viewer and at the same time to center the slide and to light a lamp which is extinguished when the slide holder is moved to discharge the slide.

Referring now more particularly to the drawings, a casing 10 preferably comprises two similar parts split centrally at the sides and longitudinally rounded at the upper end and with a segment omitted in the wall of the casing to receive a lens 12. At the bottom or lower end is a somewhat oval closure 14 which is also longitudinally split and correspondingly attached to the side portions of the casing. The casing enclosure and even the lens are preferably of light-weight plastic material which is strong and easily molded in any desired shape.

Within the casing and parallel to the lens 12 is a plastic ground glass diffuser 16 supported at its upper end by an elbow 18 extending inwardly from the adjacent portion of the casing 10 and at the lower end of the diffuser is a support 20 at the back supported by the side of the casing or by a transverse partition 22 extending partially across the casing. At the other side of the casing is a similar partition 24 which together with the partition 22 divide the casing into upper and lower portions, the lower portion forming a space for containing conventional dry batteries 26 in relatively inverted order so that the top contact 28 of one battery inserted downwardly engages one blade of a contact clip 30 secured to one section of the bottom 14 and the other blade of the contact clip engages the bottom of another battery 26, the top contact 28 of which engages a bracket 32 which extends over the outer edge of a partition 24 and supports a threaded receptacle 34 for a miniature lamp 36. The other or upper end of the first battery 26 engages a contact bracket 38 extending on both sides of the partition 24 and forming an engaging plate for the inverted bottom of the first battery below the partition 24 and with a spring contact 40 extending above the partition 24 and just below the lower edge of the diffuser 16.

Also mounted on top of the partition 24 is a conductor 42 having a bent extremity 44 in the path but normally separated from the spring contact 40 and having an extension 46 secured to the wall of the casing 10 and in line with the lamp receptacle 34 so that a pointed contact 48 of the lamp 36 will engage the conductor extension 46 making an electrical connection in a well known manner. When the spring contact 40 is pressed against the contact extension 44, a circuit will be closed through the batteries and the lamp, lighting the lamp.

Figure 4:
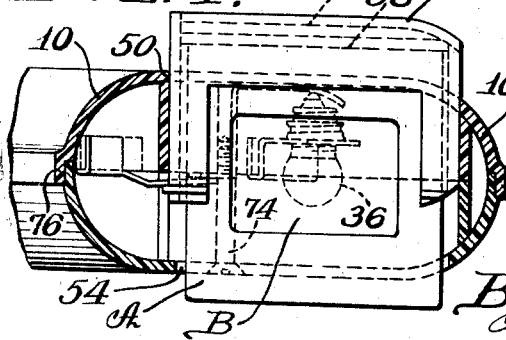
Fig. 4 is a transverse sectional view showing the slide holder in a slide exhibiting position as taken on the line 3—3 of Fig. 1.
Figure 6:
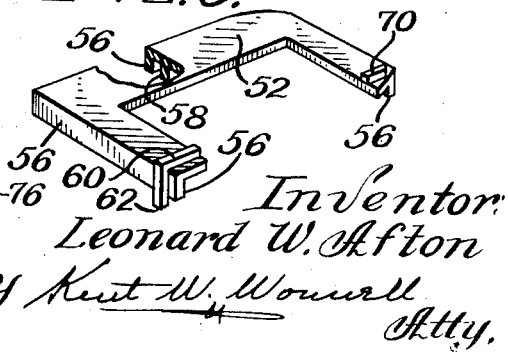
Fig. 6 is a perspective view partly broken away of the slide holder.

In the opposite side walls of the casing are an opening 50 for a slide holder 52 and an opening 54 for receiving a slide A as shown in Fig. 4. These openings are at an inclination to the bottom and sides of the casing and they are parallel to the lens 12 and to the diffuser 16 and they are directly above the diffuser. The slide holder 52 is substantially U-shaped with a flange 56 at one side extending upon the three edges of the U member. In the connection portion of the U member is a parallel flange 58 and this together with the side flanges 56 provide a three sides frame or holder for receiving a slide A to be viewed which is inserted through the slot 54, and in contact with the flange 58 to push the holder outwardly, since the outer flange 56 as shown more clearly in Fig. 2, normally closes the slot 50 when the slide holder 52 is pushed inwardly.

At one end of the U-shaped holder 52 is an outer rib 60 at the outside of the flange 56 with a projection 62 beyond the edge of the flange. The projection 62 is in the path of the movable contact 40 and the ridge 60 is adapted to engage an extension 64 at the lower edge of an inclined partition 66 which extends from the lower edge of the lens 12 and at right angles to the lower edge of the diffusion plate 16. At the upper edge of the diffuser plate 16 is an angular guide 68 for receiving the slide holder 52 therein and this edge of the slide holder has a rib 70 adapted to engage a projection 72 of the guide 68. The ribs 60 and 70 are in the paths of the projections 64 and 72 to limit the outward movement of the slide holder when it is engaged and pushed outwardly by a slide A. Engagement of the lower projection 62 from the slide holder also engages the spring contact 40 and presses it against the contact 44 to make a circuit connection for the lamp 36 when the slide A is inserted in the holder and pushes the holder partially outward from the casing.

Figure 2:
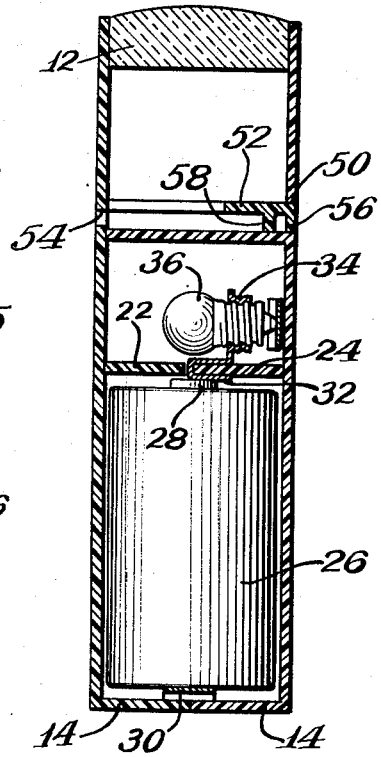
Fig. 2 is a sectional view taken on the line 2—2 of Fig. 1.
Figure 3:
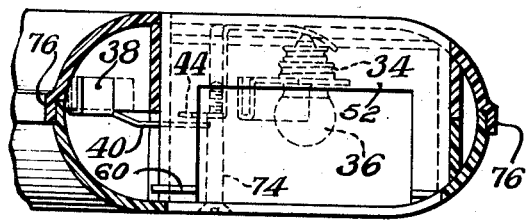
Fig. 3 is a transverse sectional view with the slide holder in a closed position as taken on the line 3—3 of Fig. 1.
Figure 5:
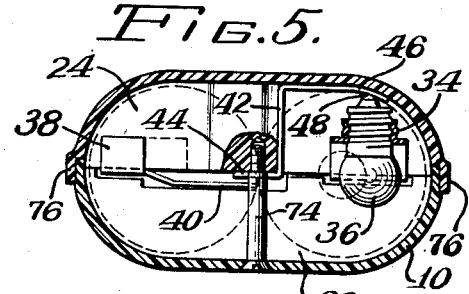
Fig. 5 is a cross sectional view taken on the line 5—5 of Fig. 1.

The lamp 36 is located in its receptacle 34 centrally of the width of the casing as shown more clearly in Fig. 2 and at a substantially equal distance from the ends of a transparency B in a slide A as shown in Figs. 3 and 4 and at a distance from the back of the diffuser 16 as shown in Fig. 1 so that when a slide is entirely inserted in the casing for viewing purposes, the lamp as shown in Fig. 4 is centered longitudinally and transversely of the transparency B to give the best illumination thereto.

After viewing a slide, it is discharged from the casing by pressing the holder 52 inwardly, thus moving the projection 62 away from the spring contact 40 and allowing it to separate from the contact 44, thereby breaking the lamp circuit.

Thus the movement of a slide in a holder to the viewing position automatically turns on the light and the discharge of the slide by pressing the slide holder 52 inwardly of the casing automatically opening the light circuit.

The location of the lens 12 is also at a particular point above the diffuser 16 and likewise above a slide when it is in place in the holder in order to produce the best results. This requires a considerable space between the bottom of the lens and the top of the holder 52 which is amply provided for in this viewer. The location of the lens aperture at an angle at the end of the casing is advantageous since the casing is readily held in one hand, exposing the slots 50 and 54 at opposite sides thereof so that a slide may be inserted through one slot 54 and into the holder which is then projected from the slot at the other side, with the lens and slide at the proper angle and clearly within the line of vision of an observer.

The casing is preferably made in similar parts divided longitudinally at the sides of the casing and the partitions 22 and 24 approximately at the longitudinal center of the casing extend from their respective casing parts to substantially close a chamber containing the batteries from the upper portion of the casing in which the lamp, the diffuser, the slide holder and the lens are located. These parts may be secured together in any suitable manner but preferably a screw 74 may be inserted from the outer side of one casing point centrally of the casing to engage the other casing part drawing them tightly together. The bottom 14 is likewise divided longitudinally and secured to both casing parts so that the bottom of the battery compartment will be closed when the casing parts are drawn together.

The edges of the casing parts may simply abut along their division line, but preferably one of the parts has an overlapping flange 76 which seals the joint more effectively and provides a more finished appearance to the casing.

While a preferred construction has been described in some detail, it should be regarded by way of illustration and example rather than a restriction or limitation thereof, as many changes in the construction, combination and arrangement of the parts may be made without departing from the spirit and scope of the invention.

I claim:

1. A hand slide viewer comprising a hollow casing, a viewing aperture at an angle in the top of the casing, a diffuser also at this angle within the casing, an electric lamp centered transversely and longitudinally in an angular space below the diffuser, opposite slots in the casing at the upper edge of the diffuser, a slide holder movable transversely on top of the diffuser normally closing the slot at one side of the casing, the slide holder being projected partially from the casing at said one side when a slide to be viewed has been completely inserted through the slot at the other side of the casing and pressed against the slide holder to center the slide in the casing, the casing adapting the viewer to be held in upright position with one hand with the said aperture at an eyeviewing angle at the top so that the slide holder and a slide therein may be moved transversely in said slots with the other hand.

2. A hand slide viewer in accordance with claim 1, in which the slide holder is provided with projections at the top and bottom to limit its movement outwardly through the slot at said one side of the casing when a slide to be viewed has been completely inserted against the holder through the slot at the other side of the casing.

3. A hand slide viewer in accordance with claim 1, in which the slide holder has a projection and the lamp has a circuit including a spring contact and a fixed contact from which the spring contact is normally separated, the spring contact being in the path of the projection of the holder and movable to close a circuit connection for lighting the lamp when a slide has been completely inserted in the casing against the holder.

4. A hand slide viewer in accordance with claim 1, in which the casing is split longitudinally and centrally with partition parts extending inwardly from opposite casing parts to form a battery containing space at the bottom of the casing separated from the lamp and diffuser at the upper portion of the casing.

5. A slide viewer in accordance with claim 4, in which one of the partition parts has brackets for embracing the opposite faces of one of the separating partitions, a lamp socket supported by one of the brackets, a spring contact supported by another of the brackets, a fixed contact extending from the back of the lamp socket to a position adjacent the spring contact, and batteries connected in the battery compartment to furnish light for a lamp in the socket when the spring contact is moved to engage the fixed contact.

6. In a hand slide viewer, a hollow casing with a viewing aperture at an angle in the top of the casing and transverse slots in the casing below the aperture, a slide holder movable transversely of the casing in said slots, means for illuminating a slide in said holder which is visible through the viewing aperture, said means comprising an electric lamp and a switch ordinarily open but engaged by the slide holder when it is moved partially out of the casing, and the slide holder being moved by a picture slide inserted in the slot at one side of the casing and moved inwardly to close the lamp switch for illuminating the slide and projecting the slide holder partially from the slot at the other side of the casing, the slide holder and the casing having engageable parts to limit the movement of the slide holder outwardly from the casing to a position in which a slide completely inserted and centered in the casing pressing the holder partially outward from the casing is centered with respect to the lamp and the viewing aperture at an angle at the top thereof.

References Cited in the file of this patent

UNITED STATES PATENTS

| | | |
|---|---|---|
| 1,712,854 | Thonet | May 14, 1929 |
| 2,040,214 | Ramirez et al. | May 12, 1936 |
| 2,239,032 | Boch | Apr. 22, 1941 |
| 2,276,735 | Miller | Mar. 17, 1942 |
| 2,349,013 | Sparling | May 16, 1944 |
| 2,594,390 | Brumberger | Apr. 29, 1952 |
| 2,604,814 | Smith | July 29, 1952 |
| 2,666,360 | Collins | Jan. 19, 1954 |
| 2,694,339 | Baireuther et al. | Nov. 16, 1954 |
| 2,720,045 | Miller | Oct. 11, 1955 |